Patented Nov. 6, 1945

2,388,409

UNITED STATES PATENT OFFICE 2,388,409

REACTION PRODUCTS OF SECONDARY ALIPHATIC ALCOHOL AND FORMALDEHYDE AND METHODS OF PRODUCING THE SAME

Mortimer T. Harvey, South Orange, N. J., assignor to Harvel Research Corporation, a corporation of New Jersey No Drawing. Application April 10, 1943, Serial No. 482,610

4 Claims. (Cl. 260—615)

This invention relates to novel condensation reaction products and to the methods and steps for producing said products. More particularly, the invention is directed to novel condensation reaction products of secondary aliphatic alcohols and certain aldehydes and to the methods and steps for producing said products. This application is a continuation in part of my copending application Ser. No. 194,227, filed March 5, 1938.

In the course of my experimentations, I have found that novel products may be obtained by reacting a secondary alcohol and formaldehyde in the presence of a relatively large quantity of acid when compared with the quantity of acid generally employed to produce an acetal with an alcohol and aldehyde. Among some of the secondary alcohols which are preferably employed in carrying out this invention are the aliphatic alcohols, preferable examples of which are isopropyl alcohol, secondary butyl alcohol and secondary amyl alcohols although any of the other secondary alcohols may be employed and examples of which are secondary hexyl alcohols, secondary heptyl alcohols, secondary octyl alcohols, secondary nonyl alcohols, secondary decyl alcohols, etc. The formaldehyde may be provided in any number of different forms, examples of which are formalin which is an aqueous solution of formaldehyde containing between 35 to 40% formaldehyde, paraformaldehyde which is a polymer of formaldehyde and generally occurs in the solid state and compounds such as hexamethylene tetramine and the like adapted to yield formaldehyde when reacted with some other compound. The acids which are preferably employed are those which I hereinafter term strong acids and this term is confined to those acids whose ionization is at least 10% in tenth normal aqueous solution and examples of which are sulphuric, nitric, hydrochloric, phosphoric, trichloracetic acids and the like.

Briefly this invention in its more specific aspect is directed to the method of and the products obtained by heating a mixture of formaldehyde, a secondary aliphatic alcohol and more than two per cent of an acid whose ionization is at least 10% in a tenth normal solution, with said percentage of acid being based on the total quantity of formaldehyde and alcohol in said mixture. The percentage of said acid in said mixture may even be as high as 100 or more. The ratio of the quantity by weight of said formaldehyde to the quantity by weight of said alcohol in said mixture may vary over wide limits. In commercial operation and production, the mole ratio of the formaldehyde to said alcohol should be at least as high as 1 to 2 and it may be as high as 10 to 1, although for most purposes, I prefer that this ratio be between 1 to 1 and 8 to 1. The quantity of said acid which I prefer to employ in said mixtures is such that the pH of the mixture is below 3 and the percentage of said acid is between about 3% and 50% of the total quantity of formaldehyde and alcohol in said mixture. In carrying out this invention the mixture of formaldehyde, secondary aliphatic alcohol and acid are heated to produce condensation reaction products having boiling points and specific gravities greater than the corresponding characteristics of the formals produced with the corresponding secondary alcohols. By employing this invention, I may produce at least 10 parts of condensation reaction products for each 100 parts of combined quantities of alcohol and aldehyde originally present in the mixture, with at 10% of this 10 parts having a boiling point at least 20 degrees above that of the formal of the corresponding secondary alcohol originally in said mixture and having a specific gravity more than 3% above that of said formal.

The invention accordingly comprises the several steps and the relation of one or more of such steps with respect to each of the others, and compositions of matter possessing the characteristics, properties and relation of components, all of which will be exemplified in the following detailed disclosure, and the scope of the invention will be indicated in the claims.

For a fuller understanding of the invention, reference should be had to the following examples which are given to illustrate further the invention and are not to be construed in a limiting sense, all parts being given by weight, unless otherwise indicated.

Example 1

About 1 mole of secondary alcohol, 1 mole of formaldehyde and 13% strong acid.

|  | Parts |
|---|---|
| Secondary heptyl alcohol (specific gravity 0.825; boiling point between 155° C. to 160° C.) | 116 |
| Aqueous solution of formaldehyde (40% formaldehyde) | 85 |
| Sulphuric acid (over 94% concentration) | 20 |
| Water | 20 |

The above mixture was heated to boiling and maintained in this state of boiling for a period of about one hour under a reflux condenser by which time the odor of formaldehyde had disappeared. This mass was allowed to cool to room temperature whereupon it separated into two main layers, an oily layer (a) and a watery layer (b). The oily layer (a) was removed therefrom. Then anhydrous potassium carbonate in quantity sufficient to dehydrate the oily layer (a) and to neutralize the sulphuric acid therein was added to the oily layer (a) and stirred therein. The thus dehydrated and neutralized oily layer (a) has a specific gravity of 0.86 and measured about 140 parts. On distillation of this separated and neutralized and dehydrated reaction product or oily layer (a), about two-thirds came over at temperatures between about 150° C. to about 260° C. and had a specific gravity of 0.850 and the residual one-third had boiling points above 260° C., with the specific gravity of this residual one-third being 0.877.

Example 2

One mole of secondary alcohol, one-half mole of paraformaldehyde and 20% strong acid.

| | Parts |
|---|---|
| Isopropyl alcohol | 120 |
| Paraformaldehyde | 30 |
| Sulphuric acid (over 94% concentration) | 30 |

The above mixture was heated to boiling and maintained in this state of boiling under a reflux condenser for a period of about five hours. The mass was allowed to cool to room temperature whereupon the mass will have separated into two main layers, an oily layer (a) and a watery layer (b). The oily layer (a) measuring about 125 parts is removed therefrom and is a solvent for cellulose nitrate. The oily layer (a) is treated with anhydrous potassium carbonate in sufficient quantity to dehydrate and neutralize said oily layer. On distillation of this separated, dehydrated and neutralized reaction product or oily layer (a), about 60% of this reaction product boils over at 80° C. to 85° C. and has a specific gravity of 0.842, the other 40% boils over at 85° C. to 100° C. and has a specific gravity of 0.864. Both of these distillate fractions are solvents for cellulose nitrate and are stable in the presence of aqueous solutions of mineral acids.

Example 3

About 1 mole of secondary alcohol, 1 mole of formaldehyde and 13% strong acid.

| | Parts |
|---|---|
| Isopropyl alcohol | 120 |
| Paraformaldehyde | 60 |
| Sulphuric acid (over 94% conc.) | 25 |

The above mixture is heated to boiling and maintained in this state of boiling under reflux condenser for about five hours and then was allowed to cool to room temperature whereupon it separated into two main layers, an oily layer (a) and a watery layer (b). The oily layer (a) was removed from the watery layer (b) and then neutralized and dehydrated with anhydrous potassium carbonate. This neutralized and dehydrated oily layer, measuring about 100 parts, was subjected to distillation whereby a fraction came over at temperatures between 90° C. and 100° C. This fraction measured about 60 parts and had a specific gravity of .0860. On further distillation a fraction came over at temperatures between 100° C. and 105° C. and measured about 30 parts. This latter fraction had a specific gravity of 0.866.

Example 4

About 1 mole of secondary alcohol, 1 mole of formaldehyde and 16% of strong acid.

| | Parts |
|---|---|
| Isopropyl alcohol | 90 |
| Aqueous formaldehyde solution (40% formaldehyde) | 120 |
| Sulphuric acid (over 94% conc.) | 21 |

The above mixture was heated in a closed and sealed container for about two hours at 165° C. with a pressure therein of between 5 and 7 atmospheres. After said period, the contents thereof was allowed to cool and on opening the container no odor of formaldehyde could be detected. The reaction mixture was neutralized and then distilled. Upon distillation a fraction which came over at temperatures between 60° C. and 80° C. dissolves cellulose nitrate, a fraction which came over at temperatures between 150° C. to 250° C. dissolves cellulose acetate, is soluble in alcohol and has a specific gravity of 0.95 and the residue which could not be distilled over temperatures up to 250° C. is soluble in ethyl alcohol, insoluble in water and has a specific gravity of 1.20 at 25° C.

Example 5

About 1 mole of secondary alcohol, 1 mole of formaldehyde and 7.5% of strong acid.

| | Parts |
|---|---|
| Isopropyl alcohol | 90 |
| Aqueous solution of formaldehyde (40% formaldehyde) | 120 |
| Sulphuric acid (over 94% conc.) | 10½ |

The above mixture was heated in a closed and sealed container for about five hours at 165° C. whereby the pressure therein was between 5 and 7 atmospheres. After the five hour period the contents were allowed to cool and on opening the container no odor of formaldehyde could be detected. The mixture was neutralized and distilled. On distillation a fraction of about 60 parts came over at temperatures between 60° C. and 80° C. and dissolves cellulose nitrate, a fraction of about 20 parts came over at temperatures between 150° C. and 250° C. and had a specific gravity of 0.93 at 25° C. and dissolves cellulose acetate and the residue which could not be distilled at temperatures over 250° C. and which measured about 20 parts, is soluble in ethyl alcohol, insoluble in water and has a specific gravity of 1.22 at 25° C.

Example 6

About 1 mole of secondary alcohol, 1 mole of formaldehyde and 5% of strong acid.

| | Parts |
|---|---|
| Isopropyl alcohol | 240 |
| Aqueous formaldehyde solution (37%) | 340 |
| Hydrochloric acid (38% concentration) | 48 |

This mixture was heated in an autoclave under 90 pounds per square inch pressure for two hours. After this period the contents thereof was allowed to cool and was then distilled into three fractions. 39% thereof distilled over at temperatures between 80° C. and 94° C. and had a specific gravity of .87; 28% thereof distilled over at temperatures between 94° C. and 130° C. and had a specific gravity of .945 and the remaining 33% could not be distilled over at 130° C. Some of this last reaction could be distilled over at temperatures above 130° C. but a portion thereof could not be distilled over at the very high temperatures employed without cracking. This 33% fraction had a specific gravity of 1.155 and was insoluble in water and soluble in ethyl alcohol. The 39% fraction was then dehydrated with anhydrous sodium sulphate. In the course of dehydration operation two layers were formed and the top oily layer was removed from the bottom layer and this top oily layer had a specific gravity of .865 and a boiling range between 78° C. and 106° C.

Example 7

About 1 mole of secondary alcohol, 1 mole of formaldehyde and 5% of strong acid.

| | Parts |
|---|---|
| Isopropyl alcohol | 240 |
| Aqueous formaldehyde solution (37%) | 340 |
| Hydrochloric acid (38% concentration) | 48 |

This mixture was heated in an autoclave under 90 lbs. per sq. in. pressure for two hours. After this two hour period, the contents were allowed to cool and then completely dehydrated and neutralized with anhydrous potassium carbonate. The oily layer separated and this oily layer had a specific gravity over .866. Upon distillation a portion thereof came over at temperatures between 82° C. and 130° C. Another portion came over at temperatures above 130° C. and approximately 15% of said oily layer could not be distilled over at temperatures above 130° C. but cracked in the attempt to distill them over by the use of high temperatures.

Example 8

About 1 mole of isopropyl alcohol, 1 mole of formaldehyde and 20% strong acid.

| | Parts |
|---|---|
| Isopropyl alcohol | 62 |
| Aqueous formaldehyde solution (40%) | 85 |
| Concentrated nitric acid | 20 |

This mixture was boiled and maintained in the state of boiling under a reflux condenser for a period of about five hours. At the end of this time the mixture was distilled whereupon 35% thereof came over at temperatures between 87° C. and 112° C. and had a specific gravity of .887. A portion came over between 112° C. and 134° C. and 25%, having a specific gravity of 1.1, could not be boiled over at temperatures as high as 134° C.

Example 9

About 1 mole of isopropyl alcohol, 1 mole formaldehyde and 9% strong acid.

| | Parts |
|---|---|
| Isopropyl alcohol | 62 |
| Aqueous formaldehyde solution (37½%) | 85 |
| Hydrochloric acid (38% concentrated) | 24 |

This mixture was heated to about 100° C. and maintained at this elevated temperature for a period of about five hours. Then the mass was distilled and upon distillation about 67% thereof came over at temperatures between 80° C. and 125° C., 25% came over at temperatures between 125° C. and 140° C. and had a specific gravity of 1.07 and practically all of the remaining 8% was too resinous to distill.

Example 10

About 1 mole secondary alcohol, 1 mole formaldehyde and 17% strong acid.

| | Parts |
|---|---|
| Secondary amyl alcohol | 88 |
| Aqueous formaldehyde solution (37½%) | 85 |
| Phosphoric acid (85% conc.) | 25 |

This mixture was placed in a copper autoclave and heated at 90 lbs. per sq. in. pressure for a period of about nine hours. After this period the contents was allowed to cool whereupon it separated into two layers, an oily layer (a) and a watery layer (b). The oily layer (a) of approximately 85 parts with a specific gravity of .882 at 25° C. was removed from the watery layer and then distilled. Upon distillation thereof 20% came over at temperatures between 94° C. and 108° C., 65% came over at temperatures between 118° C. and 190° C. and had a specific gravity of .862, and practically all of the remaining 15% was resinous and could not be distilled over without decomposing the same. This residue had a specific gravity of 0.97.

Example 11

About 2 moles isopropyl alcohol, 1 mole formaldehyde and 6% strong acid.

| | Parts |
|---|---|
| Isopropyl alcohol | 300 |
| Aqueous formaldehyde solution (37½%) | 212 |
| Sulphuric acid (over 94% conc.) | 26 |

This mixture was heated in a copper autoclave until the pressure therein was 100 lbs. per sq. in. Heating was continued and the pressure maintained for a period of about five hours. Then the contents in said autoclave were allowed to cool and removed therefrom and thereafter neutralized with an equal quantity of sodium hydroxide. The acid salts separated in a water layer which separated from the top oily layer. The top oily layer of approximately 280 parts was extracted with ether and the ether was evaporated therefrom leaving a resinous product having a specific gravity greater than 1. A portion of this product could be distilled over at temperatures above 130° C. Upon continued distillation at high temperatures above 130° C. there remained a residue which was a solid resinous product measuring 100 parts which was soluble in ethyl alcohol and insoluble in water.

Example 12

About 1 mole isopropyl alcohol, 1 mole formaldehyde and 8% strong acid.

| | Parts |
|---|---|
| Isopropyl alcohol | 300 |
| Aqueous formaldehyde solution (37½%) | 420 |
| Sulphuric acid (over 94% conc.) | 36 |

This mixture was heated in an autoclave until the pressure therein was 100 lbs. per sq. in. This condition was maintained for a period of about five hours therein. Then the contents thereof was allowed to cool and neutralized with sodium hydroxide. The mass separated into two layers, an oily layer (a) and a water layer (b). The oily layer (a) of approximately 300 parts was removed from the water layer and then distilled, whereupon about 100 parts distilled over at temperatures above 129° C. and had a specific gravity of 1.03. At the termination of the distilling operation there remained a resinous product which could not be distilled over at these elevated temperatures and was soluble in ethyl alcohol and insoluble in water.

Example 13

About 1 mole secondary alcohol, 1.5 moles formaldehyde and 4.5% strong acid.

| | Parts |
|---|---|
| Isopropyl alcohol | 300 |
| Aqueous formaldehyde solution (37½%) | 212 |
| Paraformaldehyde | 150 |
| Sulphuric acid (over 94% conc.) | 25 |

This mixture was heated in a copper autoclave to raise the pressure thereof to approximately 100 lbs. per sq. in. and maintained said temperature and pressure for a period of about five hours. Then the contents therein was allowed to cool, was neutralized with sodium hydroxide and upon subsequent separation of an oily layer from a water layer, the oily layer, measuring 350 parts, was distilled. Upon this distillation whereby there was distilled over a fraction having boiling points as high as 130° C., the oily residue which could not be distilled over at temperatures as high as 130° C., had a specific gravity of 1.10, measure 75 parts and was soluble in ethyl alcohol and insoluble in water. Upon heating this residue to a temperature as high as 200° C. for an extended period of time, the resultant product after this heating operation was a dry brittle solid soluble in ethyl alcohol.

Example 14

About 1 mole secondary alcohol, 2 moles formaldehyde and 10% strong acid.

| | Parts |
|---|---|
| Isopropyl alcohol | 300 |
| Aqueous formaldehyde solution (37½%) | 850 |
| Sulphuric acid (over 94% conc.) | 60 |

This mixture was heated in a copper autoclave until the pressure therein was 100 lbs. per sq. in. The heating was controlled to maintain this pressure for a period of about five hours. After this period the content therein was allowed to cool and neutralized with sodium hydroxide. It separated into two layers, an oily layer of 400 grams and a water layer. The oily layer was removed from the water layer and then distilled. On distillation a fraction boiling at 120° C. had a specific gravity at 25° C. of .90 and was soluble in alcohol and water. The residue after the removal of said fraction had a specific gravity of 1.23 at 25° C. and measured 100 parts. This residue when heated at temperatures as high as 200° C. for an extended period of time became a dry, solid resinous product soluble in ethyl alcohol, cellulose nitrate, cellulose acetate, shellac, phenol-formaldehyde intermediate resins, lignin, urea formaldehyde resins and is capable of being reacted with acetic anhydride and phthalic anhydride. The aforementioned fraction having a specific gravity of .90 is capable of being converted into a water insoluble product by the addition of concentrated sulphuric acid, for example by adding thereto 50% of concentrated (over 94%) sulphuric acid based on the quantity of said fraction.

Example 15

About 1.6 moles secondary alcohol, 8.8 moles formaldehyde and 14% strong acid.

| | Parts |
|---|---|
| Isopropyl alcohol | 100 |
| Aqueous formaldehyde solution (37½%) | 680 |
| Sulphuric acid (over 94% conc.) | 50 |

This mixture was heated at about 7 atmospheres pressure for about five hours. Then the contents thereof was allowed to cool and neutralized with sodium hydroxide. An oily layer of approximately 225 parts separated from the water layer. After the water and low boiling fraction was separated from said oily layer there was left approximately 75 parts of a resinous product having a specific gravity of 1.2 at 25° C. This residue had no boiling point but gave a resinous product when heated at any temperatures between 100° C. and 300° C. and was soluble in ethyl alcohol and cellulose nitrate and insoluble in water.

Example 16

About 1 mole secondary alcohol, 1 mole formaldehyde and 6% strong acid.

| | Parts |
|---|---|
| Secondary butyl alcohol (spec. grav. .806) | 75 |
| Aqueous solution of formaldehyde (37½%) | 85 |
| Sulphuric acid (over 94% conc.) | 8 |

This mixture was placed in an autoclave and heated until the pressure therein reached 100 lbs. per sq. in. This condition was maintained by heat for about four hours. Then the contents was allowed to cool to room temperature and separated into two layers, an oily layer and a watery layer. The watery layer had a specific gravity of 1.035. The oily layer which had a specific gravity of .932 was removed from the watery layer and neutralized with anhydrous sodium carbonate after which it had a specific gravity of .932. A sample of the neutralized oily layer was distilled whereupon 60% came over at temperatures between 75° C. and 130° C. and had a specific gravity of .872, was soluble in alcohol and insoluble in water, 15% came over at temperatures between 130° C. and 160° C. and had a specific gravity of .905, was soluble in alcohol and insoluble in water, the remaining 25% or residue could not be completely distilled over. A portion of this 25% could be distilled over at a temperature above 160° C. but the remainder could not be distilled over and was a resinous product having a specific gravity of 1.03 at 25° C., was insoluble in water and soluble in alcohol.

Example 17

About 1 mole secondary alcohol, 1 mole formaldehyde and 12% strong acid.

To 300 grams of isopropyl alcohol and 120 grams of hexamethylene tetramine, 110 cc. of concentrated sulfuric acid was added slowly with stirring and cooling and the whole mass was refluxed at atmospheric pressure for five hours. The excess of acid over the neutralizing effect of the hexamethylene tetramine is approximately 12%. A heavy, crystalline deposit formed at the bottom of the flask, sides and container which makes the reaction difficult to handle and the diffusion of the alcohol and the salt layer extremely small. At the end of the reaction period, water was added in order to dissolve the salts and an oily layer separated at the top. This oily layer was dehydrated and neutralized with anhydrous potassium carbonate and gave a specific gravity of .84. On shaking with an equal volume of water, 70% was insoluble in water. Distilling of this dehydrated oil gave approximately 8% boiling over 130° C., had a specific gravity of 0.95 and was insoluble in water and soluble in alcohol.

Since certain changes in carrying out the above process and certain modifications in the compositions which embody the invention may be made without departing from its scope, it is intended that all matter contained in the above description shall be interpreted as illustrative and not in a limiting sense.

Having thus described my invention, what I claim and desire to protect by Letters Patent is:

1. The method comprising boiling a mixture of about 2 molecular proportions of a secondary aliphatic alcohol and about 1 to 20 molecular proportions of formaldehyde in the presence of about 3% to 50% of a strong acid, said percentage based on the combined weights of said secondary alcohol and said formaldehyde in said mixture said boiling continued until there is produced an organic condensation reaction product being incapable of boiling at temperatures less than 20° C. above the boiling temperature of the corresponding formal, being in quantity at least 10% by weight of the combined weights of said alcohol and formaldehyde, having a specific gravity at least 3% greater than that of said formal and being substantially insoluble in water.

2. The method comprising boiling at pressure in excess of 1 atmosphere a mixture of about 2 molecular proportions of a secondary aliphatic alcohol and about 1 to 20 molecular proportions of formaldehyde in the presence of about 3% to 50% of a strong acid, said percentage based on the combined weights of said secondary alcohol and said formaldehyde in said mixture said boiling continued until there is produced an organic condensation reaction product being incapable of boiling at temperatures less than 20° C. above the boiling temperature of the corresponding formal, being in quantity at least 10% by weight of the combined weights of said alcohol and formaldehyde, having a specific gravity at least 3% greater than that of said formal and being substantially insoluble in water.

3. The method comprising boiling a mixture of about 2 molecular proportions of isopropyl alcohol and about 1 to 20 molecular proportions of formaldehyde in the presence of about 3% to 50% of a strong acid, said percentage based on the combined weights of said isopropyl alcohol and said formaldehyde in said mixture said boiling continued until there is produced an organic condensation reaction product being incapable of boiling at temperatures less than 20° C. above the boiling temperature of the corresponding formal, being in quantity at least 10% by weight of the combined weights of said alcohol and formaldehyde, having a specific gravity at least 3% greater than that of said formal and being substantially insoluble in water.

4. The method comprising boiling at pressure in excess of 1 atmosphere a mixture of about 2 molecular proportions of isopropyl alcohol and about 1 to 20 molecular proportions of formaldehyde in the presence of about 3% to 50% of sulphuric acid, said percentage based on the combined weights of said isopropyl alcohol and said formaldehyde in said mixture said boiling continued until there is produced an organic condensation reaction product being incapable of boiling at temperatures less than 20° C. above the boiling temperature of the corresponding formal, being in quantity at least 10% by weight of the combined weights of said alcohol and formaldehyde, having a specific gravity at least 3% greater than that of said formal and being substantially insoluble in water.

MORTIMER T. HARVEY.